United States Patent
Wang et al.

(10) Patent No.: US 11,937,988 B2
(45) Date of Patent: Mar. 26, 2024

(54) DENTURE TRAY FOR VISUAL MARKING AND MANUFACTURING METHOD THEREOF

(71) Applicant: BEIJING YAKEBOT TECHNOLOGY CO., LTD, Beijing (CN)

(72) Inventors: Lifeng Wang, Beijing (CN); Chen Shen, Beijing (CN); Jianyong Ren, Beijing (CN); Hongpeng Liu, Beijing (CN)

(73) Assignee: BEIJING YAKEBOT TECHNOLOGY CO., LTD, Beijing (CN)

( * ) Notice: Subject to any disclaimer, the term of this patent is extended or adjusted under 35 U.S.C. 154(b) by 498 days.

(21) Appl. No.: 17/256,133

(22) PCT Filed: May 5, 2019

(86) PCT No.: PCT/CN2019/085477
§ 371 (c)(1),
(2) Date: Dec. 24, 2020

(87) PCT Pub. No.: WO2020/001159
PCT Pub. Date: Jan. 2, 2020

(65) Prior Publication Data
US 2021/0177557 A1 Jun. 17, 2021

(30) Foreign Application Priority Data
Jun. 27, 2018 (CN) .......................... 201810678304.1

(51) Int. Cl.
*A61C 13/34* (2006.01)
*A61C 8/00* (2006.01)
(Continued)

(52) U.S. Cl.
CPC .............. *A61C 13/34* (2013.01); *A61C 8/009* (2013.01); *A61C 9/0046* (2013.01); *G06T 17/00* (2013.01); *G06T 2207/30036* (2013.01)

(58) Field of Classification Search
CPC ..... A61C 1/084; A61C 13/0004; A61C 13/34; A61C 17/06; A61C 5/90; A61C 8/009;
(Continued)

(56) References Cited

U.S. PATENT DOCUMENTS

2010/0151404 A1  6/2010  Wu et al.
2012/0100500 A1  4/2012  Gao
(Continued)

FOREIGN PATENT DOCUMENTS

CN  105596091 A  5/2015
CN  105361969 A  3/2016
(Continued)

OTHER PUBLICATIONS

CN Search Report in Application No. 2018106783041 dated Aug. 6, 2019.
(Continued)

*Primary Examiner* — Kidest Bahta
(74) *Attorney, Agent, or Firm* — Maschoff Brennan (57) ABSTRACT

Disclosed is a denture tray for visual marking and a manufacturing method thereof. The method comprises: establishing a three-dimensional model of a target dentition of a target patient; obtaining a three-dimensional model of a substrate of a denture tray based on the three-dimensional model of the target dentition; providing a through hole at a preset position on the three-dimensional model of the substrate of the denture tray; establishing a three-dimensional model of a fixed connection portion on an outer side surface of the three-dimensional model of the substrate of the denture tray to form a three-dimensional model of the
(Continued)

denture tray, wherein the three-dimensional model of the fixed connection portion is integrally connected with the three-dimensional model of the substrate of the denture tray; and manufacturing the denture tray based on the three-dimensional model of the denture tray.

12 Claims, 2 Drawing Sheets

(51) Int. Cl.
*A61C 9/00* (2006.01)
*G06T 17/00* (2006.01)
(58) Field of Classification Search
CPC ............... A61C 9/0046; G06T 17/00; G06T 2207/30036; G06T 19/00; G06T 11/00
See application file for complete search history.

(56) References Cited

U.S. PATENT DOCUMENTS

| | | | | |
|---|---|---|---|---|
| 2013/0316302 | A1* | 11/2013 | Fisker | A61C 9/0053 703/1 |
| 2015/0037756 | A1* | 2/2015 | Berckmans, III | A61B 6/032 433/214 |
| 2016/0184060 | A1* | 6/2016 | Michii | A61C 9/0006 433/46 |
| 2017/0112592 | A1 | 4/2017 | Groscurth et al. | |

FOREIGN PATENT DOCUMENTS

| | | |
|---|---|---|
| CN | 105596091 A | 5/2016 |
| CN | 105708569 A | 5/2016 |
| CN | 105708569 A | 6/2016 |
| CN | 205649560 U | 10/2016 |
| CN | 107951561 A | 4/2018 |
| CN | 108836533 A | 11/2018 |
| JP | 2013-34764 A | 2/2013 |
| JP | 2013034764 A | 2/2013 |
| WO | 2009134295 A1 | 11/2009 |
| WO | 2015179785 A1 | 11/2015 |
| WO | 2020/001159 A1 | 1/2020 |

OTHER PUBLICATIONS

International Search Report in Application No. PCT/CN2019/085477 dated Aug. 12, 2019.
European Search Report dated Feb. 15, 2022 in application No. 19826399.8.

* cited by examiner

DENTURE TRAY FOR VISUAL MARKING AND MANUFACTURING METHOD THEREOF

CROSS-REFERENCE TO RELATED APPLICATION

The present application claims priority to Chinese Application No. 2018106783041 filed on Jun. 27, 2018, entitled "Denture Tray for Visual Marking and Manufacturing Method Thereof," which is incorporated herein by reference in its entirety.

FIELD OF TECHNOLOGY

The present application relates to the technical field of intelligent manufacturing, and more particularly, to a denture tray for visual marking and a manufacturing method thereof.

BACKGROUND

The robot has the characteristics of intelligence and high precision, which gives it a unique advantage in the field of stomatology. Due to the delicate and complex structure of the oral cavity, the robot's positioning and navigation system is needed for precise positioning to improve the treatment effect.

For robotic dental implant surgery, the ability to place the implant in the exact position in the jaw is one of main factors that affect the implant effect. In robot-assisted dental implant surgery, a denture tray is needed to firmly connect the visual markers with the patient's jaw, and the robot's positioning and navigation system indirectly locates the preset implant position points by recognizing the visual markers. At present, the clinically used denture trays are made by a press molding method or an impression molding method. When denture trays are manufactured by the press molding method, steps of preparing a dentition model, press molding and polishing are required, which are time consuming, laborious, and inefficient. For the impression molding method, a method of making silicone rubber impressions is used as follows: the tray is filled with silicone rubber, and the patient bites the tray to make the tray stick on the dentition. Although the impression molding method simplifies the cumbersome production steps of the press molding, the denture tray made by impression molding method may not be securely mounted and the patient feels uncomfortable during the occlusal process.

Therefore, it has become an important issue to be solved in the industry as to how to propose a method for manufacturing a denture tray for visual marking which can not only simplify the manufacturing process of the denture tray, but also improve the reliability of mounting and fixing of the denture tray.

SUMMARY

In order to address the defects in the prior art, the present application provides a denture tray for visual marking and a manufacturing method thereof.

According to a first aspect, the present application provides a manufacturing method of denture tray for visual marking, including:

establishing a three-dimensional model of a target dentition of a target patient, where the three-dimensional model of the target dentition is a three-dimensional model of a lower dentition or a three-dimensional model of an upper dentition;

obtaining a three-dimensional model of a substrate of a denture tray based on the three-dimensional model of the target dentition;

providing a through hole at a preset position on the three-dimensional model of the substrate of the denture tray;

establishing a three-dimensional model of a fixed connection portion on an outer side surface of the three-dimensional model of the substrate of the denture tray to form a three-dimensional model of the denture tray, where the three-dimensional model of the fixed connection portion is integrally connected with the three-dimensional model of the substrate of the denture tray; and manufacturing the denture tray based on the three-dimensional model of the denture tray.

According to a second aspect, the present application provides a denture tray, including a fixed connection portion, a substrate of the denture tray, and at least one through hole, wherein:

the fixed connection portion is integrally connected with an outer side surface of the substrate of the denture tray, the at least one through hole is provided on the substrate of the denture tray, an inner surface of the substrate of the denture tray fits an outer surface of a patient's lower dentition, the fixed connection portion is configured to fix a visual marking plate, and the through hole corresponds to an implant position of the patient.

By means of the denture tray for visual marking and the manufacturing method thereof according to the present application, the target dentition three-dimensional model of the target patient can be established, and the three-dimensional model of the substrate of the denture tray can be obtained according to the target dentition three-dimensional model; then the through hole is provided in the preset position of the three-dimensional model of the substrate of the denture tray, and the three-dimensional model of the fixed connection portion is established on the outer side surface of the three-dimensional model of the substrate of the denture tray to form the three-dimensional model of the denture tray; finally the denture tray is manufactured based on the three-dimensional model of the denture tray. The substrate of the denture tray can fit the patient's lower dentition so that the denture tray is fixed on the lower or upper dentition, and the denture tray is fixedly connected to the visual marking plate through the fixed connection portion, thereby improving the reliability of mounting and fixing of the denture tray.

BRIEF DESCRIPTION OF THE DRAWINGS

In order to more clearly illustrate the technical solutions in the embodiments of the present application or the prior art, drawings needed in the description of the embodiments or the prior art are briefly introduced as follows. Obviously, the drawings in the following description are only some of the embodiments of the present application. For those of ordinary skill in the art, other drawings can be obtained based on these drawings without paying any creative effort.

DETAILED DESCRIPTION

In order to make the objectives, technical solutions and advantages of the present application clearer, the technical solutions in the embodiments of the present application will be described clearly in conjunction with the accompanying drawings in the embodiments of the present application. Obviously, the embodiments described are part of the embodiments of the present application, rather than all of the embodiments. Based on the embodiments in the present application, all other embodiments obtained by those of ordinary skill in the art without creative effort shall fall within the protection scope of the present application.

Figure 1:
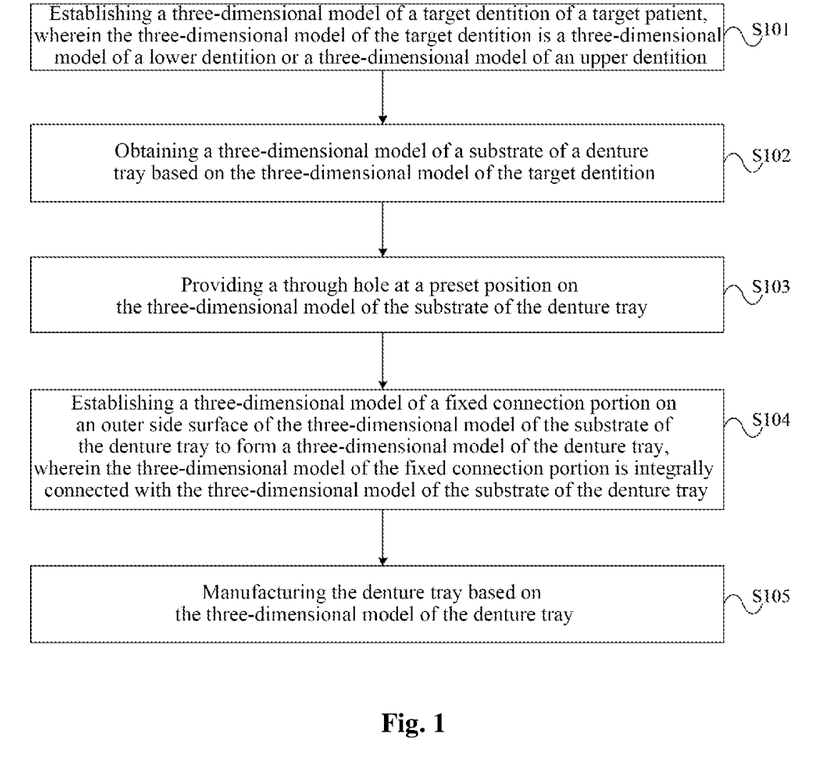
FIG. 1 is a schematic flowchart of a manufacturing method of denture tray for visual marking according to an embodiment of the present application.

FIG. 1 is a schematic flowchart of a manufacturing method of denture tray for visual marking according to an embodiment of the present application. As shown in FIG. 1, the manufacturing method of denture tray for visual marking provided by the present application includes:

S101, establishing a three-dimensional model of a target dentition of a target patient.

Specifically, the three-dimensional model of the target dentition of the target patient can be obtained by performing the oral cone beam computed tomography (CBCT) scan on the target patient, and performing the three-dimensional reconstruction on a series of two-dimensional CT images obtained by scanning using Marching cubes algorithm; where the three-dimensional model of the target dentition is a three-dimensional model of the lower dentition or a three-dimensional model of the upper dentition, and the target patient is a person who needs dental implant surgery.

S102, obtaining a three-dimensional model of a substrate of the denture tray based on the three-dimensional model of the target dentition.

Specifically, in order to fix the denture tray onto the patient's teeth, the inner surface of the substrate of the denture tray needs to fit the outer surface of the patient's upper or lower dentition. Therefore, a three-dimensional model of the substrate of the denture tray is obtained based on the three-dimensional model of the target dentition, and the inner surface of the obtained three-dimensional model of the substrate of the denture tray fits the outer surface of the three-dimensional model of the target dentition.

For example, the obtaining a three-dimensional model of a substrate of the denture tray based on the three-dimensional model of the target dentition includes: firstly, obtaining a preset number of vertices on the surface of the three-dimensional model of the target dentition based on a preset viewpoint and the preset number of position points, wherein the position points are preset; secondly, obtaining a closed curve on the surface of the three-dimensional model of the target dentition based on the preset number of vertices; thirdly, performing offset processing on a closed surface of the surface of the three-dimensional model of the target dentition above the closed curve to obtain an offset surface; finally, forming a three-dimensional model of the substrate of the denture tray based on the closed surface and the offset surface.

S103, providing a through hole at a preset position on the three-dimensional model of the substrate of the denture tray.

Specifically, since it is necessary to drill holes in the alveolar bone during dental implant surgery, a through hole through which the implant drill bit passes needs to be reserved on the three-dimensional model of the substrate of the denture tray, and thus the three-dimensional model of the substrate of the denture tray is drilled at the preset position to obtain the through hole for the implant drill bit to pass through, wherein the through hole has the shape of but not limited to a square or a circle. In an embodiment, the preset position is determined according to the actual needs of the patient for the position of the implant and is not defined in the embodiments of the present application.

S104, establishing a three-dimensional model of a fixed connection portion on an outer side surface of the three-dimensional model of the substrate of the denture tray to form a three-dimensional model of the denture tray; wherein the three-dimensional model of the fixed connection portion is integrally connected with the three-dimensional model of the substrate of the denture tray.

Specifically, since the denture tray and the visual marking plate need to be fixedly connected, in this embodiment, a fixed connection portion is provided on the denture tray to fixedly connect the denture tray to the visual marking plate. Accordingly, a three-dimensional model of the fixed connection portion is established on the outer surface of the three-dimensional model of the substrate of the denture tray, and the three-dimensional model of the fixed connection portion is integrally connected with the three-dimensional model of the target dentition. For example, the three-dimensional model of the fixed connection portion and the three-dimensional model of the substrate of the denture tray are partially overlapped, and the three-dimensional model of the fixed connection portion and the three-dimensional model of the substrate of the denture tray are connected into one body through a Boolean addition operation. The three-dimensional model of the substrate of the denture tray provided with through holes and the three-dimensional model of the fixed connection portion form a three-dimensional model of the denture tray. After the denture tray is mounted on the lower or upper dentition of the patient, the outer surface of the substrate of the denture tray included in the denture tray located outside the lower or upper dentition is the outer side surface of the substrate of the denture tray, and the outer side surface of the three-dimensional model of the substrate of the denture tray corresponds to the outer side surface of the substrate of the denture tray. The connection position of the three-dimensional model of the fixed connection portion and the three-dimensional model of the substrate of the denture tray is provided according to the actual situation and is not defined in the embodiments of the present application.

S105, manufacturing the denture tray based on the three-dimensional model of the denture tray.

Specifically, a 3D printer is used to print out the three-dimensional model of the denture tray to obtain the denture tray which includes a substrate of the denture tray, a fixed connection portion and a through hole provided on the substrate of the denture tray. The fixed connection portion is configured to fix the visual marking plate. When performing dental implant surgery, the denture tray is mounted on the lower or upper dentition of the patient so that the inner surface of the substrate of the denture tray fits the outer surface of the lower or upper dentition of the patient, so as to realize the fixation of the denture tray on the lower or upper dentition.

By means of the manufacturing method of denture tray for visual marking provided in the present application, the target dentition three-dimensional model of the target patient can be established, and the three-dimensional model of the substrate of the denture tray can be obtained according to the three-dimensional model of the target dentition; then the through hole is provided in the preset position of the three-dimensional model of the substrate of the denture tray, and the three-dimensional model of the fixed connection portion is established on the outer side surface of the three-dimensional model of the substrate of the denture tray to form the three-dimensional model of the denture tray; finally the denture tray is manufactured based on the three-dimensional model of the denture tray. The substrate of the denture tray can fit the patient's lower dentition so that the denture tray is fixed on the lower or upper dentition, and the denture tray is fixedly connected to the visual marking plate through the fixed connection portion, thereby improving the reliability of mounting and fixing of the denture tray.

Figure 2:
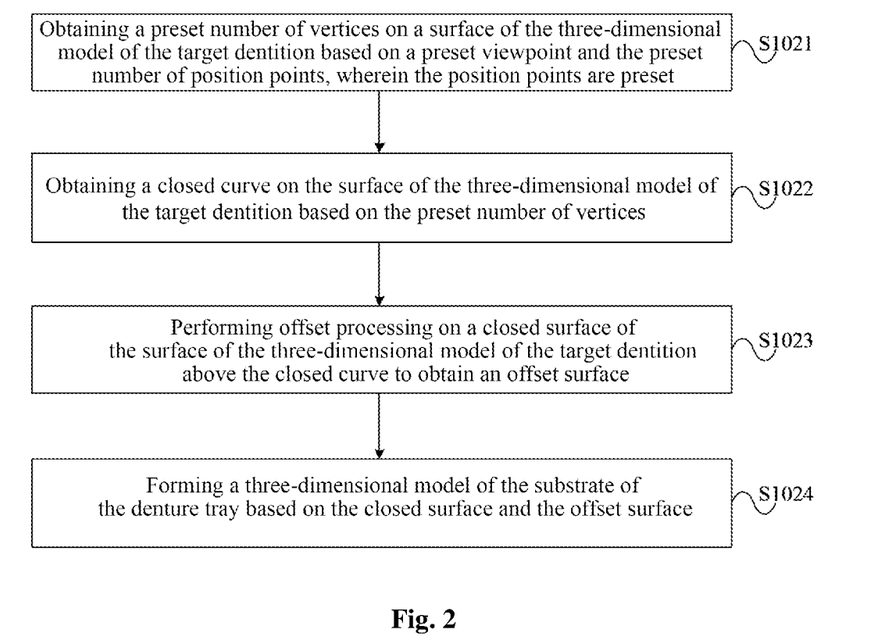
FIG. 2 is a schematic flowchart of a manufacturing method of denture tray for visual marking according to another embodiment of the present application.

FIG. 2 is a schematic flowchart of a manufacturing method of denture tray for visual marking according to another embodiment of the present application. As shown in FIG. 2, on the basis of the foregoing embodiments, the obtaining a three-dimensional model of a substrate of the denture tray based on the three-dimensional model of the target dentition includes:

S1021, obtaining a preset number of vertices on a surface of the three-dimensional model of the target dentition based on a preset viewpoint and the preset number of position points; wherein the position points are preset.

Specifically, taking the preset viewpoint as the origin of a ray, and taking the direction from the preset viewpoint to the position point as the emission direction of the ray, a ray corresponding to each of the preset number of the position points is constructed. The intersection of each ray and the surface of the three-dimensional model of the target dentition can be obtained through a ray tracing algorithm. When there is one intersection between the ray and the surface of the three-dimensional model of the target dentition, among the three vertices of the triangle mesh where the intersection is located, the vertex closest to the intersection is taken as the vertex. When there are two or more intersections between the ray and the surface of the three-dimensional model of the target dentition, among the three vertices of the triangle mesh where the intersection closest to the viewpoint among the above intersections is located, the vertex closest to the closest intersection is taken as the vertex. The vertices corresponding to each of the position points can be obtained, thereby obtaining the preset number of vertices on the surface of the three-dimensional model of the target dentition. Wherein, the preset number of position points are set according to actual needs and is not defined in the embodiment of the present application; the preset viewpoint is related to the visual angle of the three-dimensional model of the target dentition, and can be changed by rotating the three-dimensional model of the target dentition; the preset number of position points may be selected by the doctor through the mouse on the three-dimensional model of the target dentition.

S1022, obtaining a closed curve on the surface of the three-dimensional model of the target dentition based on the preset number of vertices.

Specifically, the Dijkstra algorithm is adopted to obtain the shortest path between any two adjacent vertices of the preset number of vertices on the surface of the three-dimensional model of the target dentition, and the respective vertices are connected by the shortest path to obtain a closed curve.

S1023, performing offset processing on a closed surface of the surface of the three-dimensional model of the target dentition above the closed curve to obtain an offset surface.

Specifically, the surface of the three-dimensional model of the target dentition is composed of triangular meshes, the closed curve divides the surface of the three-dimensional model of the target dentition into two parts, and the part above the closed curve forms a closed surface. Offset processing is performed on the closed surface, that is, the vertices of each of the triangular meshes on the closed surface are moved along the respective normal vector directions by a preset distance to form a new closed surface which is the offset surface. Where, for a vertex shared by multiple triangle meshes, the normal vector of the vertex can be obtained by averaging the normal vectors of the multiple triangle meshes. The preset distance is set according to actual experience and is not defined in the embodiment of the present application.

For example, vertex P is shared by 8 triangle meshes, then the normal vector N of vertex P can be calculated according to the formula $$N = \frac{\sum_{i=0}^{n-1} N_i}{\left|\sum_{i=0}^{n-1} N_i\right|},$$

where $N_i$ is the normal vector of the i-th triangle mesh, i is an integer greater than or equal to 0 and less than or equal to 7, and n is equal to 8.

S1024, forming a three-dimensional model of the substrate of the denture tray based on the closed surface and the offset surface.

Specifically, the closed surface and the offset surface are stitched to form a closed curved surface, and the closed curved surface and the enclosed internal space form a three-dimensional model of the substrate of the denture tray.

On the basis of the foregoing embodiments, the three-dimensional model of the substrate of the denture tray is smoothed after obtaining the three-dimensional model of the substrate of the denture tray.

Specifically, after the three-dimensional model of the substrate of the denture tray is obtained, the Laplacian smoothing algorithm is adopted to smooth the three-dimensional model of the substrate of the denture tray, which can smooth the triangular meshes of the three-dimensional model of the substrate of the denture tray to reduce the roughness of the surface of the model.

On the basis of the foregoing embodiments, the manufacturing method of denture tray for visual marking provided in the present application further includes:

establishing a three-dimensional model of an oral dilatation boss on the three-dimensional model of the substrate of the denture tray, wherein the three-dimensional model of the oral dilatation boss is integrally connected with the three-dimensional model of the denture tray; correspondingly, the manufacturing the denture tray based on the three-dimensional model of the denture tray includes:

manufacturing the denture tray based on the three-dimensional model of the denture tray on which the three-dimensional model of the oral dilatation boss has been established, wherein the denture tray includes the oral dilatation boss configured to dilate the patient's oral cavity to increase the space for dental implant surgery.

Specifically, the three-dimensional model of the oral dilatation boss integrally connected with the three-dimensional model of the substrate of the denture tray is established on the three-dimensional model of the substrate of the denture tray. The position and size of the three-dimensional model of the oral dilatation boss are set according to actual needs and are not defined in the embodiments of the present application. Correspondingly, the denture tray is manufactured based on the three-dimensional model of the denture tray on which the three-dimensional model of the oral dilatation boss has been established, and the denture tray printed by the 3D printer includes the oral dilatation boss corresponding to the three-dimensional model of the oral dilatation boss. The oral dilatation boss is configured to hold against the upper jaw of the patient to dilate the patient's oral cavity so as to increase the space for dental implant surgery, and the surface of the dilatation boss in contact with the upper or lower dentition of the patient can be made into a zigzag shape to prevent it from slipping when it contacts the upper or lower dentition.

For example, a three-dimensional model of a cuboid with a length×width×height of 30 mm×10 mm×12 mm is established on the three-dimensional model of the substrate of the denture tray, and the bottom surface of the three-dimensional model of the cuboid, that is, a 30 mm×12 mm surface, is integrally connected with the outer surface of the three-dimensional model of the substrate of the denture tray by partially overlapping the three-dimensional model of the cuboid with the three-dimensional model of the substrate of the denture tray, and then by a Boolean addition operation. Then the top surface of the three-dimensional model of the cuboid, that is, a 30 mm×12 mm surface, is made into a zigzag-shaped surface, and the three-dimensional model of the cuboid subjected to the above processing forms a three-dimensional model of the oral dilatation boss. In order to reduce the weight of the oral dilatation boss, a hole or groove may be provided in the middle of the three-dimensional model of the cuboid in the case of ensuring the strength of the oral dilatation boss. In an embodiment, the specific position of the three-dimensional model of the cuboid on the three-dimensional model of the substrate of the denture tray is set according to actual experience and is not defined in the embodiments of the present application.

On the basis of the foregoing embodiments, the manufacturing method of denture tray for visual marking provided in the present application further includes:

establishing a three-dimensional model of a saliva-ejection insertion hole on the three-dimensional model of the substrate of the denture tray; correspondingly, the manufacturing the denture tray based on the three-dimensional model of the denture tray includes:

manufacturing the denture tray based on the three-dimensional model of the denture tray on which the three-dimensional model of the saliva-ejection insertion hole has been established, wherein the denture tray includes the saliva-ejection insertion hole configured to place a saliva ejector.

Specifically, the three-dimensional model of the saliva-ejection insertion hole is provided on the three-dimensional model of the substrate of the denture tray, and the position and size of the three-dimensional model of the saliva-ejection insertion hole are set according to actual needs and are not defined in the embodiments of the present application. Correspondingly, the denture tray is manufactured based on the three-dimensional model of the denture tray on which the three-dimensional model of the saliva-ejection insertion hole has been established, and the denture tray printed by the 3D printer includes the saliva-ejection insertion hole corresponding to the three-dimensional model of the saliva-ejection insertion hole. During the dental implant surgery, saliva will be constantly produced in the patient's oral cavity, and bleeding may occur. Thus, the saliva ejector can be inserted into the saliva-ejection insertion hole for ejecting saliva to prevent the patient from being choked by saliva or blood, and the saliva-ejection insertion hole facilitates the placement of the saliva ejector.

On the basis of the foregoing embodiments, the manufacturing method of denture tray for visual marking provided in the present application further includes:

establishing a three-dimensional model of an oral baffle on the outer side surface of the three-dimensional model of the substrate of the denture tray, wherein the position of the three-dimensional model of the oral baffle corresponds to the position of the through hole, and the three-dimensional model of the oral baffle is integrally connected with the three-dimensional model of the denture tray; correspondingly, the manufacturing the denture tray based on the three-dimensional model of the denture tray includes:

manufacturing the denture tray based on the three-dimensional model of the denture tray on which the three-dimensional model of the oral baffle has been established, wherein the denture tray includes the oral baffle configured to protect an inner wall of the patient's oral cavity during dental implant surgery.

Specifically, the three-dimensional model of the oral baffle is established on the outer side surface of the three-dimensional model of the substrate of the denture tray, and the position of the three-dimensional model of the oral baffle corresponds to the position of the through hole, that is, the three-dimensional model of the oral baffle is correspondingly provided in the position where the through hole is provided on the three-dimensional model of the substrate of the denture tray. The shape and size of the three-dimensional model of the oral baffle are set according to actual needs and are not defined in the embodiments of the present application. Correspondingly, the denture tray is manufactured based on the three-dimensional model of the denture tray on which the three-dimensional model of the oral baffle has been established, and the denture tray printed by the 3D printer includes the oral baffle corresponding to the three-dimensional model of the oral baffle. During the dental implant surgery, the implant handpiece needs to be inserted into the oral cavity of the patient to drill holes at the position where a tooth need to be implanted. After installing the denture tray including the oral baffle on the lower or upper dentition of the patient, the implant handpiece will drill inside the oral baffle. The oral baffle defines the safe operation area of the implant handpiece, can prevent the implant handpiece from touching the inner wall of the patient's oral cavity, and thus enhances the safety of the dental implant surgery.

For example, a three-dimensional model of a semicircular tube with a radius of 12 mm, a length of 30 mm, and a thickness of 2 mm is established on the outer side surface of the three-dimensional model of the substrate of the denture tray where the through hole is provided, and the three-dimensional model of the semicircular tube is integrally connected with the outer side surface of the three-dimensional model of the substrate of the denture tray where the through hole is provided by partially overlapping the three-dimensional model of the semicircular tube with the three-dimensional model of the substrate of the denture tray, and then by a Boolean addition operation. The three-dimensional model of the semicircular tube subjected to the above processing forms the three-dimensional model of the oral baffle. Where, the specific position of the three-dimensional model of the semicircular tube on the three-dimensional model of the substrate of the denture tray is set according to actual experience and is not defined in the embodiments of the present application.

On the basis of the foregoing embodiments, the three-dimensional model of the fixed connection portion includes a three-dimensional model of a mounting hole and three-dimensional models of at least two positioning holes, and an axis of the three-dimensional model of the positioning hole is perpendicular to an axis of the three-dimensional model of the mounting hole.

Specifically, the three-dimensional model of the fixed connection portion includes a three-dimensional model of the mounting hole and three-dimensional models of at least two positioning holes, and the axis of the three-dimensional model of the positioning hole is perpendicular to the axis of the three-dimensional model of the mounting hole. The mounting shaft of the visual marking plate can be inserted into the mounting hole of the fixed connection portion, and the positioning hole may be a pin hole or a screw hole. After the positioning pins or screws are mounted in the positioning holes, the mounting shaft of the visual marking plate can be fixed, so that the denture tray and the visual marking plate are fixedly connected. Where, the sizes of the mounting hole and the positioning holes are set according to actual needs and are not defined in the embodiments of the present application. The visual marking plate includes three discs which are configured to install optical markings, and the optical markings made by 3D printing or UV inkjet printing can be pasted or installed on the above three discs. The visual marking plate can be manufactured by ordinary metal processing technology, or by 3D printing.

Figure 3:
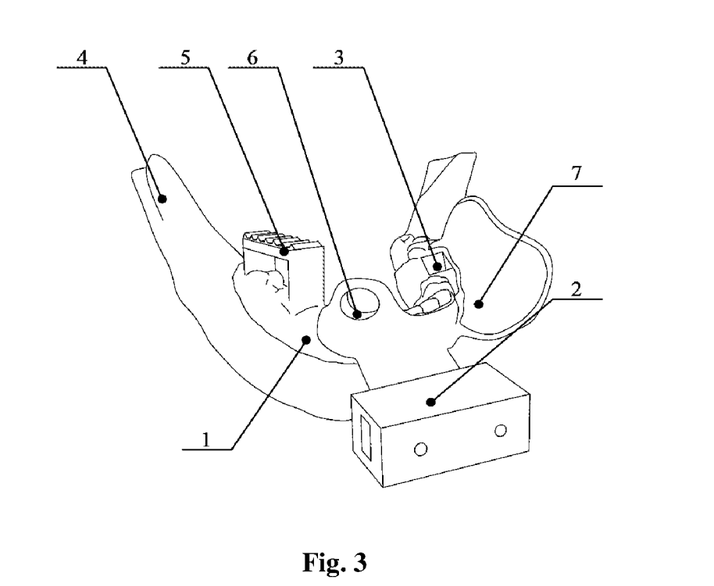
FIG. 3 is a schematic diagram of the structure of a denture tray according to an embodiment of the application.

FIG. 3 is a schematic diagram of the structure of a denture tray according to an embodiment of the application. As shown in FIG. 3, the denture tray provided by the present application includes a fixed connection portion 2, a substrate 1 of the denture tray, and at least one through hole 3, wherein:

the fixed connection portion 2 is integrally connected with an outer side surface of the substrate 1 of the denture tray, at least one through hole 3 is provided on the substrate 1 of the denture tray, an inner surface of the substrate 1 of the denture tray fits an outer surface of a lower dentition on a patient's mandible 4, the fixed connection portion 2 is configured to fix a visual marking plate, and the through hole 3 corresponds to an implant position of the patient.

Specifically, when performing dental implant surgery, the denture tray provided by the embodiment of the present application is installed on the patient's lower or upper dentition through the substrate of the denture tray 1, so that the inner surface of the substrate 1 of the denture tray fits the outer surface of the lower or upper dentition of the patient, thereby fixing the denture tray to the lower or upper dentition. The position of the patient's dental implant is exposed through the through hole 3 to facilitate drilling during the dental implant surgery. The fixed connection portion 2 is configured to fix a visual marking plate, and the denture tray and the visual marking plate are fixedly connected by the fixed connection portion 2.

For the denture tray provided in the present application, since the substrate of the denture tray can fit the patient's lower dentition, the denture tray is fixed on the lower or upper dentition, and the denture tray is fixedly connected to the visual marking plate through the fixed connection portion, thereby improving the reliability of mounting and fixing of the denture tray.

On the basis of the foregoing embodiments, the fixed connection portion 2 includes a mounting hole and at least two positioning holes, and an axis of the positioning hole is perpendicular to an axis of the mounting hole.

Specifically, the fixed connection portion 2 includes a mounting hole and at least two positioning holes, and an axis of the positioning hole is perpendicular to an axis of the mounting hole. The mounting shaft of the visual marking plate can be inserted into the mounting hole of the fixed connection portion 2, and the positioning hole may be a pin hole or a screw hole. After the positioning pins or screws are installed in the positioning holes, the mounting shaft of the visual marking plate can be fixed, so that the denture tray and the visual marking plate are fixedly connected. In an embodiment, the sizes of the mounting hole and the positioning holes are set according to actual needs and are not defined in the embodiments of the present application.

As shown in FIG. 3, on the basis of the foregoing embodiments, the denture tray provided by the present application further includes at least one of a saliva-ejection insertion hole 6, an oral dilatation boss 5 and an oral baffle 7, wherein:

the saliva-ejection insertion hole 6 is provided on the substrate 1 of the denture tray and is configured to place a saliva ejector; the oral dilatation boss 5 is disposed on the substrate 1 of the denture tray, integrally connected with the substrate 1 of the denture tray, and configured to dilate the patient's oral cavity to increase the space for dental implant surgery; and the oral baffle 7 is disposed corresponding to the through hole 3, integrally connected with an outer side surface of the substrate 1 of the denture tray, and configured to protect the inner wall of the patient's oral cavity during dental implant surgery.

Specifically, during the dental implant surgery, saliva is continuously produced in the oral cavity of the patient and bleeding may occur during the dental implant surgery. The saliva ejector can be inserted into the saliva-ejection insertion hole 6 to eject saliva to prevent the patient from being choked by saliva or blood, and the saliva-ejection insertion hole 6 facilitates the placement of the saliva ejector. In an embodiment, the specific position and size of the saliva-ejection insertion hole are set according to actual needs and are not defined in the embodiments of the present application.

The oral dilatation boss 5 is configured to hold against the upper jaw of the patient to dilate the patient's oral cavity to increase the space for dental implant surgery, and the surface of the oral dilatation boss 5 in contact with the upper or lower dentition of the patient can be made into a zigzag shape to prevent it from slipping when it contacts the upper or lower dentition. In an embodiment, the position and size of the oral dilatation boss 5 are set according to actual needs and are not defined in the embodiments of the application.

The position of the oral baffle 7 corresponds to the position of the through hole 3, that is, the oral baffle 7 is correspondingly provided at the position where the through hole 3 is provided on the denture tray. The shape and size of the oral baffle 7 are set according to actual needs and are not defined in the embodiments of the application. During the dental implant surgery, the implant handpiece needs to be inserted into the oral cavity of the patient to drill holes through the through hole 3. After installing the denture tray including the oral baffle 7 on the lower or upper dentition of the patient, the implant handpiece will drill inside the oral baffle 7. The oral baffle 7 defines the safe operation area of the implant handpiece, can prevent the implant handpiece from touching the inner wall of the patient's oral cavity, and thus enhances the safety of the dental implant surgery.

For the embodiments of the denture tray provided in the present application, detailed description may be given with reference to the foregoing method embodiments, which will not be repeated here.

Finally, it should be noted that the embodiments above are only for illustrating the technical solutions of the present application, rather than limiting them; although the present application has been described in detail with reference to the foregoing embodiments, those skilled in the art should understand that the technical solutions documented in the preceding embodiments may still be modified, or parts of the technical features thereof can be equivalently substituted; and such modifications or substitutions do not cause the essence of the corresponding technical solutions to deviate from the spirit and scope of the technical solutions of the embodiments of the present application.

The invention claimed is:

1. A manufacturing method of denture tray for visual marking, the method comprising:
    establishing a three-dimensional model of a target dentition of a target patient, wherein the three-dimensional model of the target dentition is a three-dimensional model of a lower dentition or a three-dimensional model of an upper dentition;
    obtaining a three-dimensional model of a substrate of the denture tray based on the three-dimensional model of the target dentition;
    providing a through hole at a preset position on the three-dimensional model of the substrate of the denture tray;
    establishing a three-dimensional model of a fixed connection portion on an outer side surface of the three-dimensional model of the substrate of the denture tray to form a three-dimensional model of the denture tray, wherein the three-dimensional model of the fixed connection portion is integrally connected with the three-dimensional model of the substrate of the denture tray; and
    manufacturing the denture tray based on the three-dimensional model of the denture tray;
    wherein obtaining the three-dimensional model of the substrate of the denture tray based on the three-dimensional model of the target dentition comprises:
        obtaining a preset number of vertices on a surface of the three-dimensional model of the target dentition based on a preset viewpoint and the preset number of position points, wherein the position points are preset obtaining a closed curve on the surface of the three-dimensional model of the target dentition based on the preset number of vertices; performing offset processing on a closed surface of the surface of the three-dimensional model of the target dentition above the closed curve to obtain an offset surface; and forming a three-dimensional model of the substrate of the denture tray based on the closed surface and the offset surface.

2. The method of claim 1, further comprising: smoothing the three-dimensional model of the substrate of the denture tray after the three-dimensional model of the substrate of the denture tray is obtained.

3. The method of claim 1, further comprising:
    establishing a three-dimensional model of a saliva-ejection insertion hole on the three-dimensional model of the substrate of the denture tray; the manufacturing the denture tray based on the three-dimensional model of the denture tray correspondingly comprises:
        manufacturing the denture tray based on the three-dimensional model of the denture tray on which the three-dimensional model of the saliva-ejection insertion hole has been established, wherein the denture tray includes the saliva-ejection insertion hole configured to place a saliva ejector.

4. The method of claim 1, wherein the three-dimensional model of the fixed connection portion includes a three-dimensional model of a mounting hole and three-dimensional models of at least two positioning holes, and an axis of the three-dimensional model of the positioning hole is perpendicular to an axis of the three-dimensional model of the mounting hole.

5. A manufacturing method of denture tray for visual marking, the method comprising:
    establishing a three-dimensional model of a target dentition of a target patient, wherein the three-dimensional model of the target dentition is a three-dimensional model of a lower dentition or a three-dimensional model of an upper dentition;
    obtaining a three-dimensional model of a substrate of the denture tray based on the three-dimensional model of the target dentition;
    providing a through hole at a preset position on the three-dimensional model of the substrate of the denture tray;
    establishing a three-dimensional model of a fixed connection portion on an outer side surface of the three-dimensional model of the substrate of the denture tray to form a three-dimensional model of the denture tray, wherein the three-dimensional model of the fixed connection portion is integrally connected with the three-dimensional model of the substrate of the denture tray;
    manufacturing the denture tray based on the three-dimensional model of the denture tray;
    wherein the method further comprises:
        establishing a three-dimensional model of an oral dilatation boss on the three-dimensional model of the substrate of the denture tray, wherein the three-dimensional model of the oral dilatation boss is integrally connected with the three-dimensional model of the denture tray; the manufacturing the denture tray based on the three-dimensional model of the denture tray correspondingly comprises:
        manufacturing the denture tray based on the three-dimensional model of the denture tray on which the three-dimensional model of the oral dilatation boss has been established, wherein the denture tray includes the oral dilatation boss configured to dilate the patient's oral cavity to increase the space for dental implant surgery.

6. The method of claim 5, further comprising: smoothing the three-dimensional model of the substrate of the denture tray after the three-dimensional model of the substrate of the denture tray is obtained.

7. The method of claim 5, further comprising:
    establishing a three-dimensional model of a saliva-ejection insertion hole on the three-dimensional model of the substrate of the denture tray; the manufacturing the denture tray based on the three-dimensional model of the denture tray correspondingly comprises:
        manufacturing the denture tray based on the three-dimensional model of the denture tray on which the three-dimensional model of the saliva-ejection insertion hole has been established, wherein the denture tray includes the saliva-ejection insertion hole configured to place a saliva ejector.

8. The method of claim 5, wherein the three-dimensional model of the fixed connection portion includes a three-dimensional model of a mounting hole and three-dimensional models of at least two positioning holes, and an axis of the three-dimensional model of the positioning hole is perpendicular to an axis of the three-dimensional model of the mounting hole.

9. A manufacturing method of denture tray for visual marking, the method comprising:
    establishing a three-dimensional model of a target dentition of a target patient, wherein the three-dimensional model of the target dentition is a three-dimensional model of a lower dentition or a three-dimensional model of an upper dentition;
    obtaining a three-dimensional model of a substrate of the denture tray based on the three-dimensional model of the target dentition;
    providing a through hole at a preset position on the three-dimensional model of the substrate of the denture tray;
    establishing a three-dimensional model of a fixed connection portion on an outer side surface of the three-dimensional model of the substrate of the denture tray to form a three-dimensional model of the denture tray, wherein the three-dimensional model of the fixed connection portion is integrally connected with the three-dimensional model of the substrate of the denture tray;
    manufacturing the denture tray based on the three-dimensional model of the denture tray;
    wherein the method further comprises:
        establishing a three-dimensional model of an oral baffle on the outer side surface of the three-dimensional model of the substrate of the denture tray, wherein the position of the three-dimensional model of the oral baffle corresponds to the position of the through hole, and the three-dimensional model of the oral baffle is integrally connected with the three-dimensional model of the denture tray; the manufacturing the denture tray based on the three-dimensional model of the denture tray correspondingly comprises:
    manufacturing the denture tray based on the three-dimensional model of the denture tray on which the three-dimensional model of the oral baffle has been established, wherein the denture tray includes the oral baffle configured to protect an inner wall of the patient's oral cavity during dental implant surgery.

10. The method of claim 9, further comprising: smoothing the three-dimensional model of the substrate of the denture tray after the three-dimensional model of the substrate of the denture tray is obtained.

11. The method of claim 9, further comprising:
    establishing a three-dimensional model of a saliva-ejection insertion hole on the three-dimensional model of the substrate of the denture tray; the manufacturing the denture tray based on the three-dimensional model of the denture tray correspondingly comprises:
    manufacturing the denture tray based on the three-dimensional model of the denture tray on which the three-dimensional model of the saliva-ejection insertion hole has been established, wherein the denture tray includes the saliva-ejection insertion hole configured to place a saliva ejector.

12. The method of claim 9, wherein the three-dimensional model of the fixed connection portion includes a three-dimensional model of a mounting hole and three-dimensional models of at least two positioning holes, and an axis of the three-dimensional model of the positioning hole is perpendicular to an axis of the three-dimensional model of the mounting hole.

* * * * *